US 9,619,661 B1

United States Patent
Finkelstein

(10) Patent No.: US 9,619,661 B1
(45) Date of Patent: Apr. 11, 2017

(54) PERSONAL INFORMATION DATA MANAGER

(71) Applicant: Charles Finkelstein Consulting LLC, Woodinville, WA (US)

(72) Inventor: Charles Finkelstein, Woodinville, WA (US)

(*) Notice: Subject to any disclaimer, the term of this patent is extended or adjusted under 35 U.S.C. 154(b) by 0 days.

(21) Appl. No.: 14/742,655

(22) Filed: Jun. 17, 2015

Related U.S. Application Data

(60) Provisional application No. 62/013,250, filed on Jun. 17, 2014.

(51) Int. Cl.
- *G06F 7/04* (2006.01)
- *G06F 15/16* (2006.01)
- *G06F 17/30* (2006.01)
- *H04L 29/06* (2006.01)
- *G06F 21/60* (2013.01)

(52) U.S. Cl.
CPC .................. *G06F 21/604* (2013.01)

(58) Field of Classification Search
CPC ... H04L 63/08; H04L 63/083; H04L 63/0861; H04W 12/06; G06F 21/31

USPC ............................................................ 726/7
See application file for complete search history.

(56) References Cited

U.S. PATENT DOCUMENTS

| | | | | |
|---|---|---|---|---|
| 2009/0287837 | A1* | 11/2009 | Felsher | G06F 19/322 709/229 |
| 2010/0317420 | A1* | 12/2010 | Hoffberg | G06Q 30/0207 463/1 |
| 2013/0159021 | A1* | 6/2013 | Felsher | G06F 19/322 705/3 |

* cited by examiner

*Primary Examiner* — Kambiz Zand
*Assistant Examiner* — Stephen Sanders
(74) *Attorney, Agent, or Firm* — FSP LLC

(57) ABSTRACT

A method and system for managing personal data is provided as a means to increase the efficiency and effectiveness of personal data access, approval and curation across multiple content sources. The method and system accomplishes this by discovering, identifying, collecting normalizing personal information from content sources then alerting the user to any identifiable use of their personal information and allowing the user to directly dictate personal information use policies and manually control individual personal data attributes on multiple content platforms.

5 Claims, 7 Drawing Sheets

PERSONAL INFORMATION DATA MANAGER

CROSS-REFERENCE TO RELATED APPLICATIONS

This application claims priority and benefit under 35 U.S.C. 119 to U.S. application Ser. No. 62/013,250, filed on Jun. 17, 2014, which is incorporated by reference herein in its entirety.

BACKGROUND

With the proliferation internet technology, and the development of big data and social networking, personal data is becoming ever-increasingly public. It is also becoming increasingly difficult to update personal information across manage what entities have access to your personal data, whether or not these entities are showing accurate information, and whether or not they are improperly using said data.

BRIEF SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

Embodiments of a system and methods are described which discovers, tracks and manages the release and update of personal information throughout it's lifecycle across multiple applications and web-based environments.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
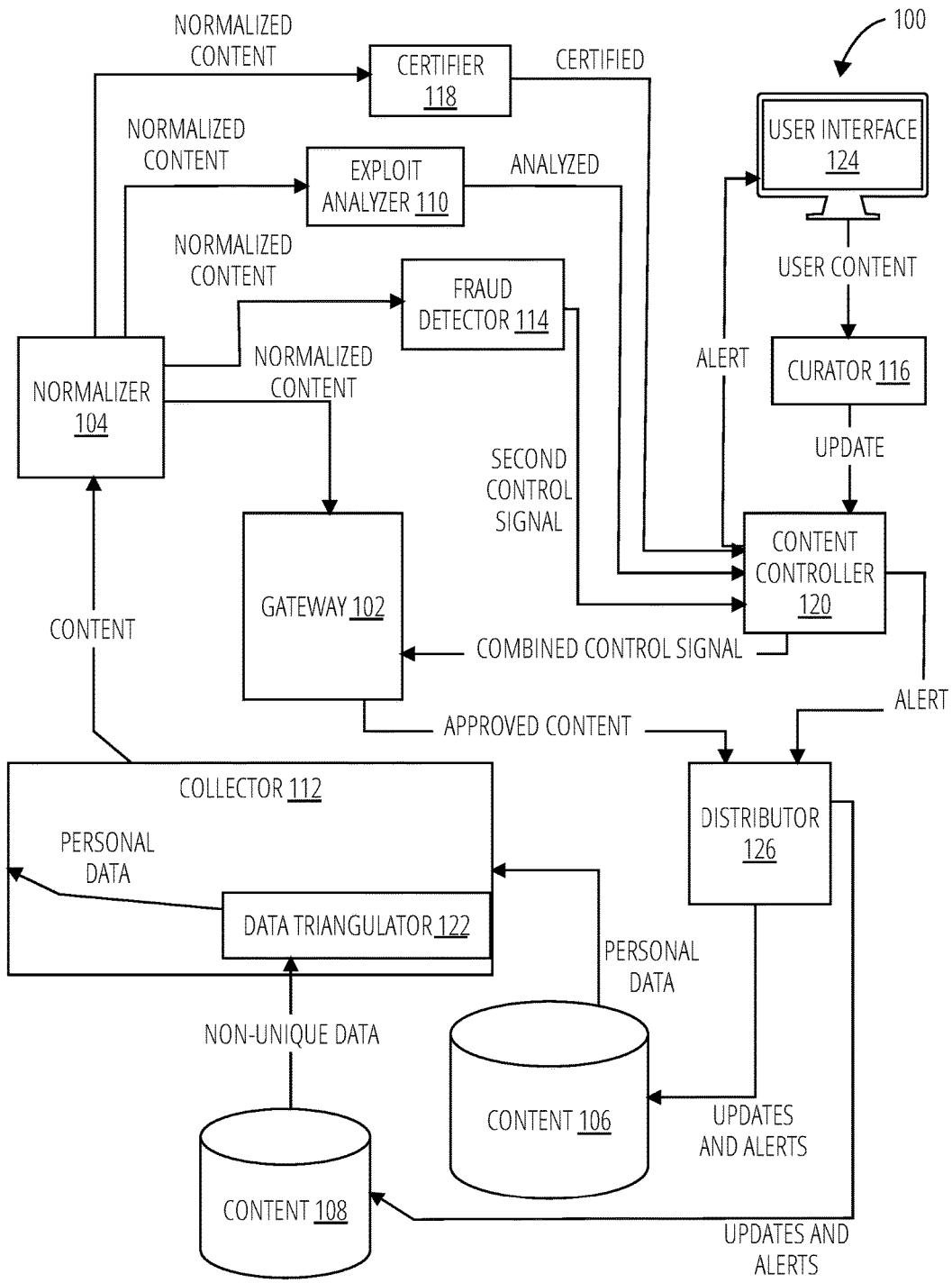
FIG. 1 is a system diagram of an embodiment of a personal data management system.
Figure 2:
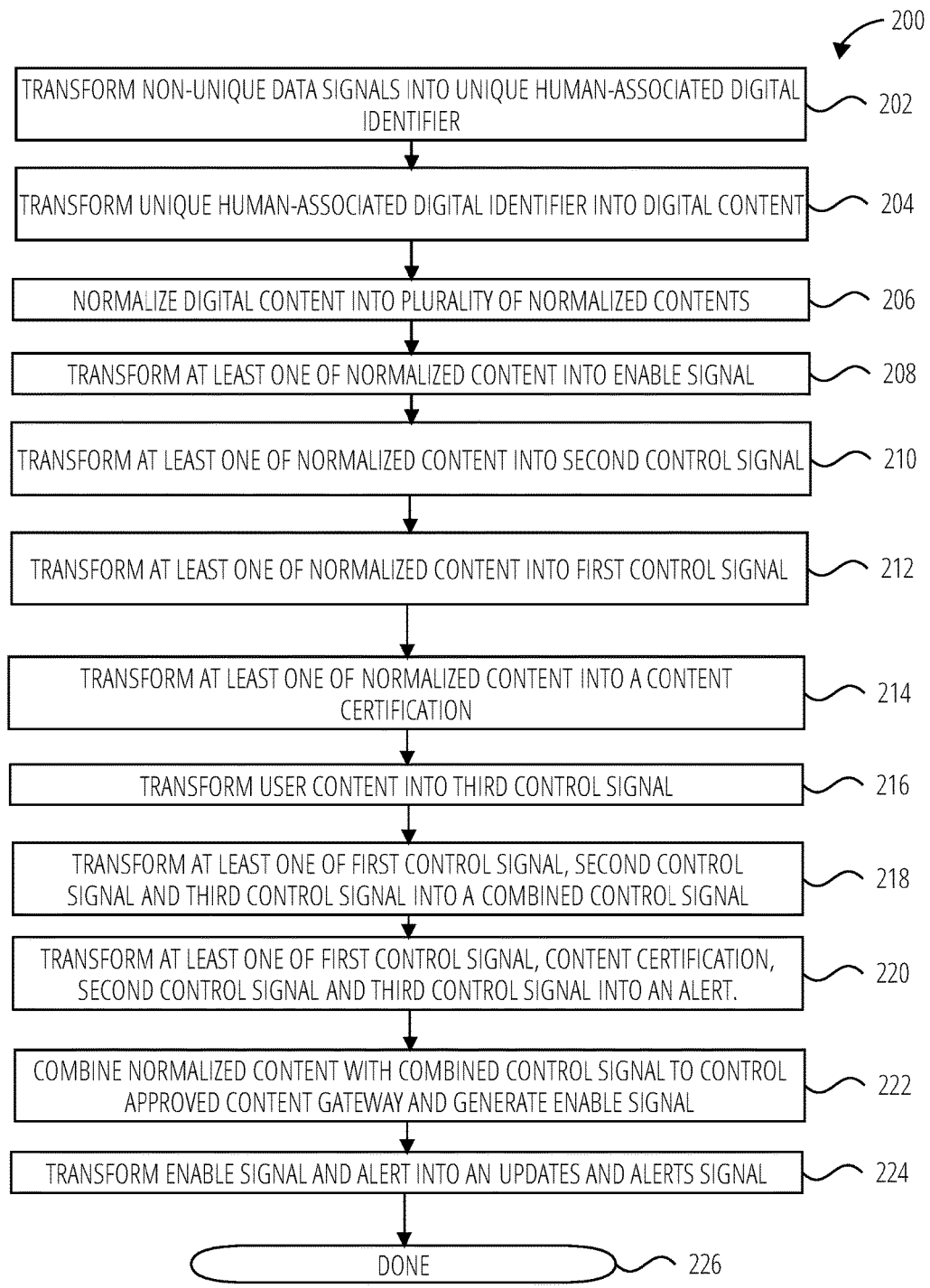
FIG. 2 illustrates a routine for managing personal data in accordance with one embodiment.
Figure 3:
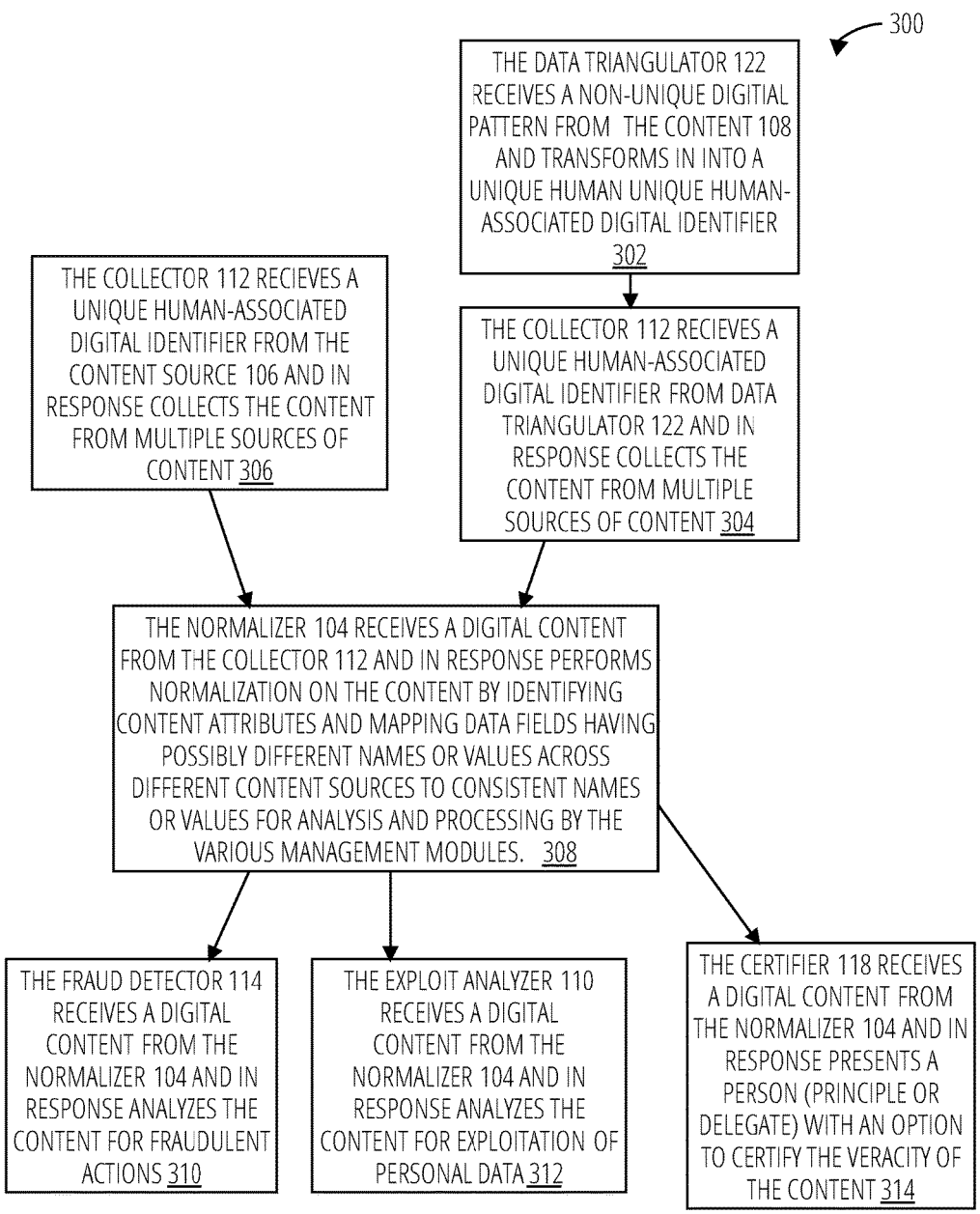
FIG. 3 illustrates a routine for managing personal data in accordance with one embodiment.
Figure 4:
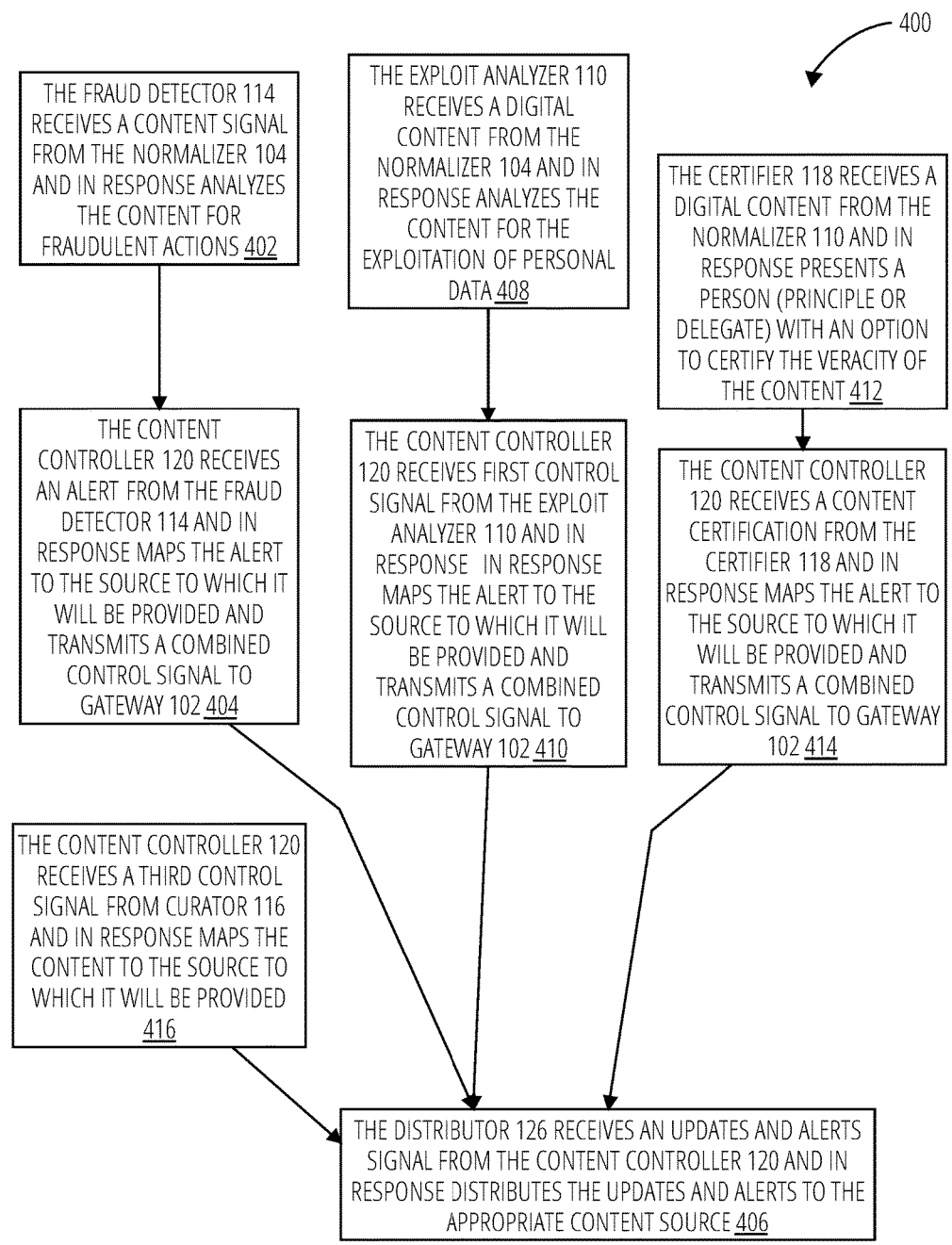
FIG. 4 illustrates a routine for managing personal data in accordance with one embodiment.
Figure 5:
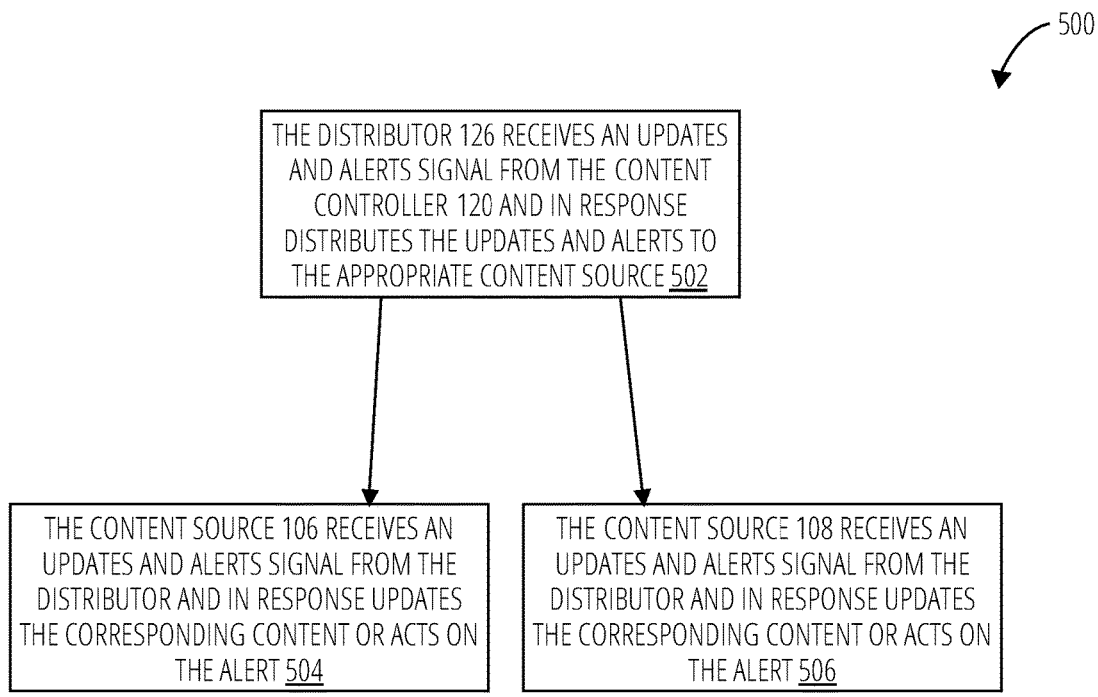
FIG. 5 illustrates a routine for managing personal data in accordance with one embodiment.

"content source" in this context refers to a website, application or other internet-based location which contains personal data "security question answers" in this context refers to answers given to a user authentication question such as "What is your mother's maiden name?"

"non-unique personal data attributes" in this context refers to such attributes that are not unique to an individual, such as height, name, weight, sexual orientation.

"unique personal data attributes" in this context refers to such attributes that are unique to an individual, such as a social security number.

DESCRIPTION

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to or combined, without limiting the scope to the embodiments disclosed herein.

A system embodiment is described herein that includes components and logic to implement a universal client having a user interface to visualize complex personal data distributed across many content sources on the Internet (or other wide area networks). The data is visualized by the system in manners relevant to the person, who is enabled to control relevance/context scoring vectors for individual or logical groups of personal data. The system also includes a universal data connector service for collecting/crawling personal data, a data curation service accessible from the user interface, a distributor service for exporting/pushing content back out to content sources, and a synchronization services that is notified when external sources have updates, imports, and any changes are exported and "sync'd" back to the content sources. The system is useful for managing personal data for consumers (private persons), businesses (entities that monetize personal information), enterprise customers (knowledge workers within organizations), as well as business-to-business.

In some embodiments, a system may include a data triangulator to transform a non-unique digital pattern into a unique human-associated digital identifier; a collector to transform the unique human-associated digital identifier into digital content; a normalizer to transform the digital content into a group of normalized content; a certifier to transform the normalized content into a content certification; an exploit analyzer to transform the normalized content into a first control signal; a fraud detector to transform the normalized content into a second control signal; a curator to transform a user content into a third control signal; a content controller to transform the third control signal, the content certification, the first control signal, and the second control signal into an alert and a combined control signal; a gateway to transform the combined control signal and the normalized content into an enable signal; and/or a distributor to respond to the enable signal and the alert to communicate the normalized content to at least one machine server.

In some embodiments, the normalizer may include logic to receive the digital content and convert the digital content into the normalized content with standardized constituent personal data attributes, logic to send the digital content to the certifier, logic to send the digital content to the exploit analyzer, and/or logic to send the digital content to the fraud detector.

In some embodiments, the exploit analyzer may include Logic to apply a user data policy containing rules for data usage to the normalized content to create the first control signal.

In some embodiments, the fraud detector may include logic to compare the normalized content to a group of user data attributes such as social security number, current address, previous address, date of birth, mother's maiden name, and security question answers.

In some embodiments, the collector may include logic to identify personal information from a content source and/or logic to transmit collected content to the normalizer logic.

In some embodiments, the data triangulator may include logic to parse the non-unique digital pattern into at least one non-unique personal data attributes, logic to compare the non-unique personal data attributes to user personal data attributes and compile into the unique human-associated digital identifier, and/or logic to transmit the unique human-associated digital identifier to the collector.

In some embodiments, the content controller may include logic to receive at least one of the content certification, the first control signal, and the second control signal and generate the alert corresponding to the received signal and/or logic to receive at least one of the content certification, the first control signal, the second control signal and the third control signal, and combine the signals into the combined control signal.

In some embodiments, the data triangulator may include logic to aggregate the non-unique personal data attributes from content signals and determine the similarity of the non-unique personal data attributes with the non-unique personal data attributes with the user's non-unique personal data attributes.

1. Viewing and curating data on subscription based IaaS applications such as Facebook, Amazon, Microsoft, Google, or viewing and curating data on subscription based B 2 B data brokers such as Axciom or marketing data providers such as Datalogix, comscore, Gatner and others or viewing and curating data on subscription based B 2 C data REPORTING agencies such as Equifax and TransUnion, or bacground information aggregators/providers Intelius or viewing and curating personal data stored with retailers such Target and Walmart,
  a. User logs into Personal data App (with 2nd factor authentication)
  b. The application shows in tree view and other views the Web based services that have their personal data.
  c. The personal data app has been authenticated by standard means to access their current data in these systems, and/or may do common screen scraping techniques—these actions happen in the background as a service and/or when the user hits update refresh on selected services
  d. For example when the user decided to view Facebook, they see the data the Facebook explicitly has from the user:
    i. Basic PII
    1. Legal name
    2. Social security number (if available)
    3. Title
    4. Gender
    5. Height
    6. Weight
    7. Ethnicity
    8. Age
    9. Address(es)
    10. Phone number(s)
    11. Email address(es)
    12. Other contact info, (e.g. Web page, twitter, etc)
    ii. Extended PII
    1. Marital status
    2. Education history, grades and status
    3. Veteran status
    4. Sexual preference(s)
    5. Credit score
    6. Relationship preferences
    7. Income if available
    8. Place(s) of work
    9. Places where they live(d)
    10. Family and relationships
    11. Life events (e.g. weddings, births, graduations, vacations, incl place, date, time)
    12. Hobbies
    13. Interests
    14. Health conditions
    15. Memberships and affiliations
    16. Political classifications and affiliations
    iii. Consumption PII (white list and black list)
    1. Music and Entertainment preferences (white list and black list)
    2. Food interests
    3. Health interests
    4. Lifestyle interests
    5. Recreational interest (e.g. bike, hike ski.
    6. Vacation interests
    7. Informational preferences (news, books, etc.)
    8. Brand preferences in all categories
    9. Influencers
    10. Retailer preferences
    11. Medical preferences
    12. Medical procedures
    13. Credit score
    14. Insurance ratings
    15. Accident histories
    16. Everything else
  e. The user views these details—each one has a date from created, last modified, etc, and opt-in/legal note for in-policy or out of policy (controlled by the user, and meeting local laws)
  f. They may edit, add or delete any of them. The associated meta data in e is updated.
  g. They then push the updates back out to the services—
    i. where they have direct access, the information is auto updated,
    ii. where they do not have access to change, it is in the services update queue—must comply to local laws
  h. The user may then see a log of the updates and then view them
    i. the user may do them for each services a-h for each service individually or perform global changes, via our normalization algorithms
  j. The user may run "monitor policy" to see if any of the services is out of policy with local laws and their intentions as appropriate
  k. Out of policy notifications are triggered by J and/or automatically from back ground services
  l. Out of policy events may have automated remediation (configured by user or default), OR manual intervention by the user.

Curation is the process of keeping content fresh, relevant, and accurate. A curator 108 (e.g., a person operating a machine on a network) may now and again provide content updates, which the system will distribute intelligently across the various content sources in a consistent manner. Thus, for example, a single update to a person's job description may be intelligently normalized and distributed across multiple social media sites and job posting sites. The normalizer 110 receives content updates signal from the curator 108 and in response maps the content to the specific form of the source to which it will be provided (412). From there the content is communicated for distribution to (potentially multiple) sources. The system may enable the curator to choose what specific information to view at any time, such as view credit score only, (with the source of the data)

A system consistent with the described embodiment may be utilized to implement a "persomation" app for a PC, Mac or mobile device, either as a standalone app or from within a browser or other app. This app may provide a current and unified view and management portal for a representation of the data representing a person (personal data) from all over the Internet. The data includes and is not limited to: personal financial, demographic, and preference information; things a person likes and dislikes, things a person wishes to purchase, sell, rent, offer for rent, and time frames for such things, etc. Likes and dislikes (whitelist and black list) includes products, services, brand names, companies, organizations, public figures, artist entities such as bands, troupes, artists, entertainers, etc. The person can view and manage the data, either in Tree form (with typical sorting views of, typical taxonomys), or a 2.5D (simulated 3D) interface where the data looks like spheres or recognizable objects, where the size of the object is strength of the relevance score (how personally relevant is the data to the person). Objects are connected to object based on configurable relevancy (e.g. slider controls for people, places, things, events, finance, retail . . . etc.)

DRAWINGS

The system comprises content 108, content 106, Collector 112, curator 116, Normalizer 104, Fraud detector 114, Exploit analyzer 110, and Certifier 118. The Collector 112 receives content from content sources 106, 108 and in response collects the content for normalization and distribution to various management modules. Content may be collected into a buffer, for example a FIFO, or may be processed immediately, or may be buffered and prioritized for processing according to source. Content sources include local devices (PC, LAN server, tablet, mobile phone, etc.), "cloud" locations, and any source that stores data components representing a person or entity explicitly or in an obfuscated fashion, (e.g. GUID).

Content sources may be accessed utilizing a driver model. The system may include specific data source "connectors" built on generic interfaces that call the most optimal methods for gaining access to the source(s), then collecting/distributing data back. For example, local file and/or database methods with local access controls may be utilized for locally access able data stores, e.g. mounted file systems. In the case of accessing personal data on a social network, ecommerce site or financial data warehouse, specific data connectors are built, and loaded, utilizing methods such as REST, JSON, SOAP, Protocol Buffers, and others as appropriate to verify credentials, collect content and distribute updates, etc. Some sources may require subscriptions or some other secure method to access, For example a person may pay also store personal information such as financial accounts and passwords in an encrypted removable device, such as to make it virtually un-hackable.

In some embodiments, a Collector 112 receives a unique human-associated digital identifier from content 106 and transforms it into a digital content. Data triangulator 122 receives a non-unique digital pattern from content 108 and correlates identified data to existing data and transforms a non-unique digital pattern into a unique human-associated digital identifier. Collector 112 transforms personal data signals into a digital content which it transmits to Normalizer 104.

Normalizer 104 receives a digital content and transforms it into a normalized contents by identifying content attributes and standardizing data formatting. Normalization involves mapping data fields having possibly different names or values across different content sources to consistent names or values for analysis and processing by the various management modules. The normalized content is then distributed to the various management modules.

Certifier 118 receives a normalized content from the Normalizer 104 and in response transforms it into a content certification and transmits the content certification to the Content controller 120. The Content controller 120 receives this alert from the Certifier 118 and in response maps the alert to the specific form of the source to which it will be provided, such a User interface 124 which presents a person (principle or delegate) with an option to certify the veracity of the content. If the content is validly associated with the person, they may provide an alert indicating its validity. The alert may be passed back to the appropriate content sources which provide an indication that the content is certified by its "owner", that is, the person it is for/about. If the content is not validly associated with the person, a different alert (indicating the content is uncertified) may be generated and passed through to the content sources, which post a corresponding "uncertified" indication for the content.

Exploit analyzer 110 receives a normalized content and in response analyzes the content for exploitation of personal data and transforms it into a first control signal and transmits it to a Content controller 120. Exploitation may involve use of personal data for monetary gain, without authorization to do so. Detected exploitation may be reported to the person whose data is being exploited using a machine-human interface. The person may choose to act to end the exploitation by contacting the content source or the person exploiting the content.

Fraud detector 114 receives a normalized content and in response analyzes the content for fraudulent actions and transforms it into a first control signal and transmits it to a Content controller 120. Fraudulent activity can include false attribution of the content to a person or entity; false or misleading statements in conjunction with the content; or other use of the content in a fraudulent or misleading manner. If fraud is detected, an alert may be generated for distribution back to the content source. The Gateway 102 receives the alert from the fraud detector 112 and in response maps the alert to the specific form of the source to which it will be provided. The distributor 126 receives the alert from the Content controller 120 and in response distributes the alert to the appropriate content sources. The content sources 106, 108 receive the content update signal from distributor 126 which may include an alert and in response act on the alert, for example by removing or flagging the corresponding content.

Curator 116 receives a user content from a User interface 124 and transforms the digital content into a third control signal and transmits it to Content controller 120.

Content controller 120 receives a third control signal, a second control signal, a first control signal and a content certification and sends a combined control signal to Gateway 102 operate Gateway 102 and transmit an enable signal to Collector 112.

Content controller 120 receives a third control signal, a second control signal, a first control signal and a content certification and sends an alert to User interface 124 to notify user of the need for additional action or approval.

Distributor 126 receives an approved content and alert and sends updates and alerts signal to content 106 and content 108.

In block 202, routine 200 transforms non-unique data signals into a unique human-associated digital identifier.

In block 204, routine 200 transforms the unique human-associated digital identifier into a digital content.

In block 206, routine 200 normalizes the digital content into a plurality of normalized content.

In block 208, routine 200 transforms at least one of the normalized content into an enable signal.

In block 210, routine 200 transforms at least one of the normalized content into a second control signal.

In block 212, routine 200 transforms at least one of the normalized content into an alert.

In block 214, routine 200 transforms a user content into a third control signal.

In block 216, routine 200 transforms at least one of the first control signal.

In block 218, routine 200 transforms at least one of the first control signal.

In block 220, routine 200 combines a normalized content with a combined control signal to control an approved content gateway and generate an enable signal.

In block 222, routine 200 transforms an enable signal and alert into an updates and alerts signal.

In done block 224, routine 200 ends.

In block 306, the Data triangulator 122 receives a non-unique digital pattern from the content 108 and transforms it into a unique human-associated digital identifier.

In block 304, collector 112 receives a unique human-associated digital identifier from data triangulator 122 and in response collects the content from multiple sources of content In block 302, collector 112 receives a unique human-associated digital identifier from the content source 106 and in response collects the content from multiple sources of content.

In block 308, the normalizer 104 receives a digital content from the Collector 112 and in response performs normalization on the content by identifying content attributes and mapping data fields having possibly different names or values across different content sources to consistent names or values for analysis and processing by the various management modules.

In block 310, the fraud detector 114 receives a digital content from the normalizer 104 and in response analyzes the content for fraudulent actions.

In block 312, the exploit analyzer 110 receives a digital content from the normalizer 104 and in response analyzes the content for exploitation of personal data.

In block 314, the certifier 118 receives a digital content from the normalizer 104 and in response presents a person (principle or delegate) with an option to certify the veracity of the content.

In block 402, the fraud detector 114 receives a content signal from the normalizer 104 and in response analyzes the content for fraudulent actions.

In block 404, the exploit analyzer 110 receives digital content from the normalizer 104 and in response analyzes the content for the exploitation of personal data.

In block 406, the certifier 118 receives a digital content from the normalizer 110 and in response presents a person (principle or delegate) with an option to certify the veracity of the content.

In block 408, the content controller 120 receives an alert from the Fraud detector 114 and in response maps the alert to the source to which it will be provided and transmits a combined control signal to Gateway 102

In block 414, the content Content controller 120 receives a first control signal from the exploit analyzer 110 and in response in response maps the alert to the source to which it will be provided and transmits a combined control signal to Gateway 102.

In block 412, the Content controller 120 receives a content certification from the certifier 118 and in response maps the alert to the source to which it will be provided and transmits a combined control signal to Gateway 102.

In block 410, The content controller 120 receives a third control signal from curator 116 and in response maps the content to the source to which it will be provided.

In block 416, the distributor 126 receives an updates and alerts signal from the content controller 120 and in response distributes the updates and alerts to the appropriate content source.

In block 502, the distributor 126 receives an updates and alerts signal from the content controller 120 and in response distributes the updates and alerts to the appropriate content source.

In block 504 the content source 106 receives an updates and alerts signal from the distributor and in response updates the corresponding content or acts on the alert.

In block 506 the content source 108 receives an updates and alerts signal from the distributor and in response updates the corresponding content or acts on the alert.

Figure 6:
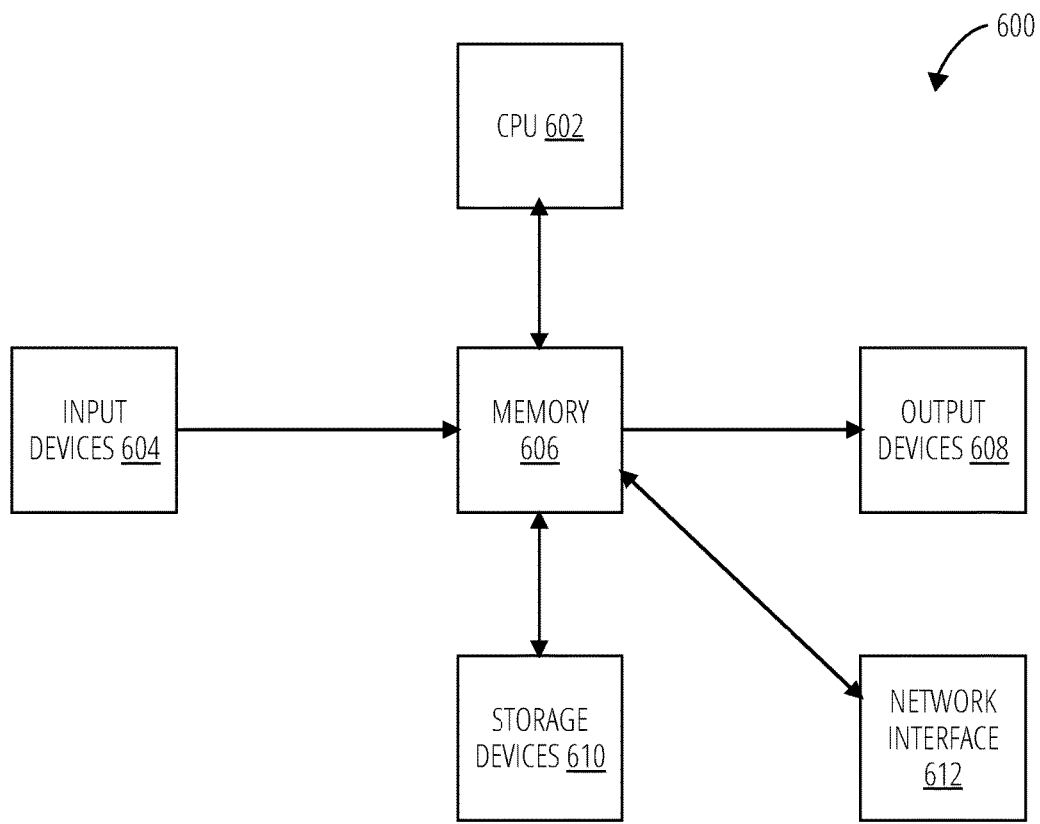
FIG. 6 illustrates an embodiment of a digital apparatus 600 to implement components and process steps of the system described herein.

FIG. 6 illustrates an embodiment of a digital apparatus 600 to implement components and process steps of the system described herein.

Input devices 604 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 604 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 604 are provided via various machine signal conductors (e.g., busses or network interfaces) and circuits to memory 606.

The memory 606 is typically what is known as a first or second level memory device, providing for storage (via configuration of matter or states of matter) of signals received from the input devices 604, instructions and information for controlling operation of the CPU 602, and signals from storage devices 610.

Information stored in the memory 606 is typically directly accessible to the CPU 602 of the device. Signals input to the device cause the reconfiguration of the internal material/energy state of the memory 606, creating in essence a new machine configuration, influencing the behavior of the digital apparatus 600 by affecting the behavior of the CPU 602 with control signals (instructions) and data provided in conjunction with the control signals.

Second or third level storage devices 610 may provide a slower but higher capacity machine memory capability. Examples of storage devices 610 are hard disks, optical disks, large capacity flash memories or other non-volatile memory technologies, and magnetic memories.

The CPU 602 may cause the configuration of the memory 606 to be altered by signals in storage devices 610. In other words, the CPU 602 may cause data and instructions to be read from storage devices 610 in the memory 606 from which may then influence the operations of CPU 602 as instructions and data signals, and from which it may also be provided to the output devices 608. The CPU 602 may alter the content of the memory 606 by signaling to a machine interface of memory 606 to alter the internal configuration, and then converted signals to the storage devices 610 to alter its material internal configuration. In other words, data and instructions may be backed up from memory 606, which is often volatile, to storage devices 610, which are often non-volatile.

Output devices 608 are transducers which convert signals received from the memory 606 into physical phenomenon such as vibrations in the air, or patterns of light on a machine display, or vibrations (i.e., haptic devices) or patterns of ink or other materials (i.e., printers and 3-D printers).

The network interface 612 receives signals from the memory 606 and converts them into electrical, optical, or wireless signals to other machines, typically via a machine network. The network interface 612 also receives signals from the machine network and converts them into electrical, optical, or wireless signals to the memory 606.

Figure 7:
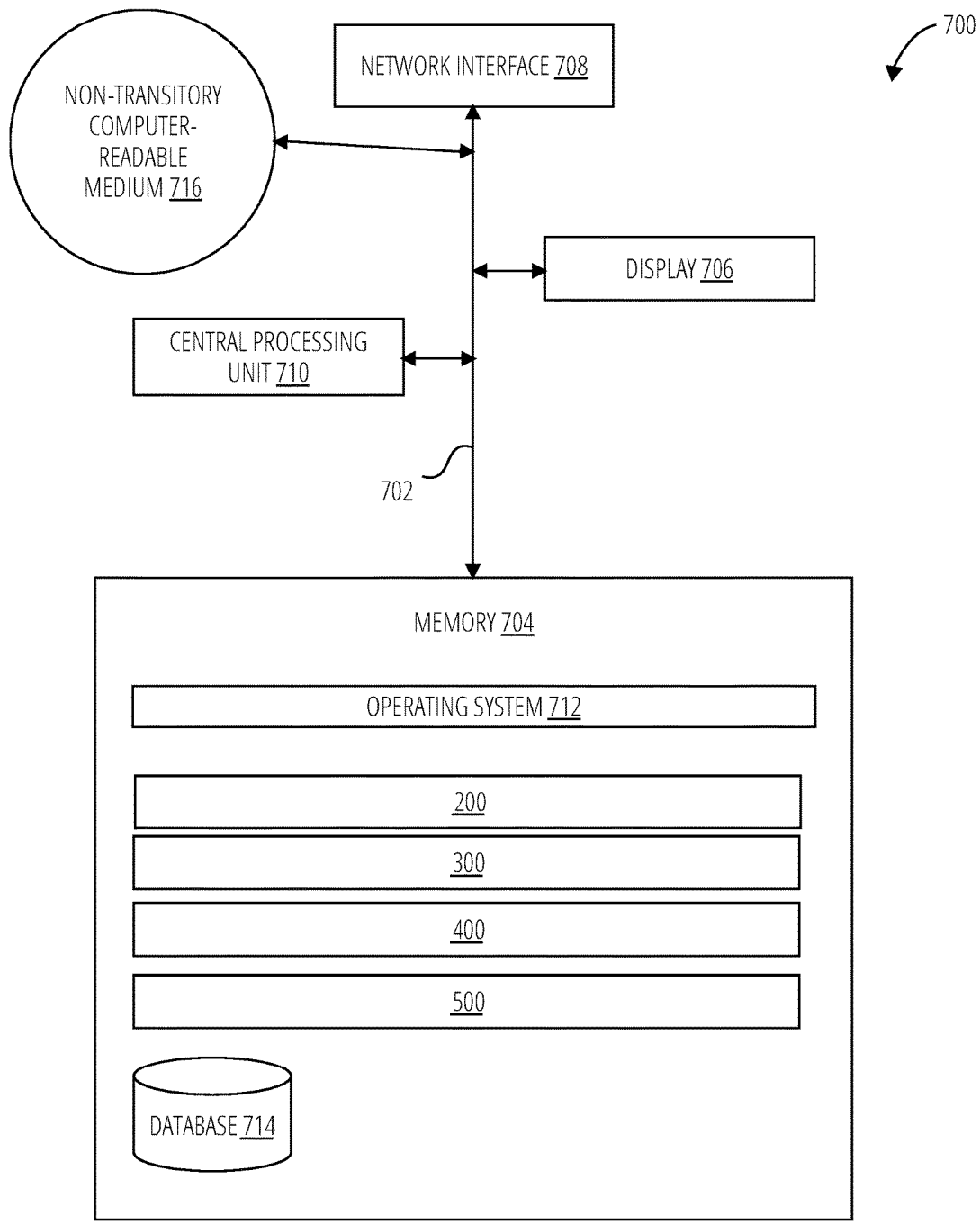
FIG. 7 illustrates a server 700 in accordance with one embodiment.

FIG. 7 illustrates several components of an exemplary server 700 in accordance with one embodiment. In various embodiments, server 700 may include a desktop PC, server, workstation, mobile phone, laptop, tablet, set-top box, appliance, or other computing device that is capable of performing operations such as those described herein. In some embodiments, server 700 may include many more components than those shown in FIG. 7. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, server 700 may comprise one or more physical and/or logical devices that collectively provide the functionalities described herein. In some embodiments, server 700 may comprise one or more replicated and/or distributed physical or logical devices.

In some embodiments, server 700 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Server 700 includes a bus 702 interconnecting several components including a network interface 708, a display 706, a central processing unit 710, and a memory 704.

Memory 704 generally comprises a random access memory ("RAM") and permanent non-transitory mass storage device, such as a hard disk drive or solid-state drive. Memory 704 stores an operating system 712.

These and other software components may be loaded into memory 704 of server 700 using a drive mechanism (not shown) associated with a non-transitory computer-readable medium 716, such as a floppy disc, tape, DVD/CD-ROM drive, memory card, or the like.

Memory 704 also includes database 714. In some embodiments, server 200 (deleted) may communicate with database 714 via network interface 708, a storage area network ("SAN"), a high-speed serial bus, and/or via the other suitable communication technology.

In some embodiments, database 714 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A system comprising:
   machine-readable instructions that when executed by one or more computer processors, configure the system to:
   transform a non-unique digital pattern into a unique human-associated digital identifier;
   collect digital content associated with said unique human-associated digital identifier;
   transform said digital content into a plurality of normalized content, each normalized content comprising a format of the digital content adapted to a different destination web site on which to post the normalized content;
   generate a content certification for the normalized content;
   apply a data policy comprising rules for data usage by a user uniquely associated with the digital identifier to the normalized content to generate a first control signal;
   analyze said normalized content for fraudulent activity to generate a second control signal;
   receive additional content from a machine user interface and curate the additional content into a third control signal;
   controller logic activated by said third control signal, said content certification, said first control signal, and said second control signal to generate an alert and a combined control signal;
   a digital gateway coupled to the controller logic to transform said combined control signal into an enable signal to a digital content distributor; and
   the digital content distributor activated by said enable signal and said alert to modify the normalized content with the additional content and transmit the modified normalized content to the different destination web sites.

2. The system of claim 1 wherein transforming said digital content into the plurality of normalized content comprises receiving the digital content and converting said digital content into the normalized content with standardized constituent personal data attributes.

3. The system of claim 1 wherein analyzing said normalized content for fraudulent activity further comprises comparing the normalized content to a plurality of data attributes for the user.

4. The system of claim 1 further comprising machine-readable instructions that when executed by the one or more computer processors, configure the system to identify personal information for the user from a digital content source.

5. The system of claim 1 wherein transforming the non-unique digital pattern into the unique human-associated digital identifier further comprises:
   parsing the non-unique digital pattern into at least one non-unique personal data attributes; attribute;

comparing said at least one non-unique personal data attribute to user personal data attributes; and compiling the user personal data attributes into the unique human-associated digital identifier.

\* \* \* \* \*